United States Patent [19]

Braun

[11] 4,120,200

[45] Oct. 17, 1978

[54] METHOD AND DEVICE FOR PYROMETRIC TEMPERATURE MEASUREMENTS

[75] Inventor: Klaus Joachim Braun, Uberlingen, Fed. Rep. of Germany

[73] Assignee: Bodenseewerk Perkin-Elmer & Co., GmbH, Uberlingen, Fed. Rep. of Germany

[21] Appl. No.: 805,752

[22] Filed: Jun. 13, 1977

[30] Foreign Application Priority Data

Jun. 18, 1976 [DE] Fed. Rep. of Germany ....... 2627254

[51] Int. Cl.² ............................ G01J 5/52; G01J 5/62
[52] U.S. Cl. ................................................ 73/355 R
[58] Field of Search ..................... 73/355 R, 355 EM; 356/47, 48; 350/2

[56] References Cited

U.S. PATENT DOCUMENTS

| 2,512,257 | 6/1950 | Pfund | 350/2 |
|---|---|---|---|
| 2,964,427 | 12/1960 | Rheinberger et al. | 350/2 |
| 2,976,730 | 3/1961 | Howell | 356/48 |
| 3,091,693 | 5/1963 | Rudomanski et al. | 73/355 X |
| 3,105,906 | 10/1963 | Schultz et al. | 73/355 |
| 3,363,457 | 1/1968 | Ruehle et al. | 73/154 |
| 3,489,008 | 1/1970 | Thornton | 73/355 |
| 3,916,690 | 11/1975 | Brandli | 73/355 |

Primary Examiner—Herbert Goldstein
Attorney, Agent, or Firm—Salvatore A. Giarratana; Francis L. Masselle; John D. Crane

[57] ABSTRACT

The invention relates to a method and apparatus for measuring the temperature of an object within a temperature range of between about 100° C and about 2700° C by deriving a signal indicative of the temperature of the object from the total radiation within a limited wavelength range extending from about 8 to about 14 microns. In one form of the invention, a device is provided which includes a radiation detector, a reference member, a temperature control device for automatically maintaining the temperature of the reference member at a substantially constant value, a device for alternately directing radiation from the object and from the reference through a filter to the radiation detector, a signal processing system for receiving signals from the radiation detector and outputting a signal indicative of the temperature of the object, responsive to the difference between the radiation detected from the object and from the reference member.

9 Claims, 6 Drawing Figures

METHOD AND DEVICE FOR PYROMETRIC TEMPERATURE MEASUREMENTS

BACKGROUND OF THE INVENTION

This invention relates to a method and apparatus for pyrometrically measuring temperatures of an object within a range of between about 100° C and about 2700° C.

There is a problem in pyrometrically measuring the temperature of an object having a large range of temperatures such as, for example, between 100° C and 2700° C. The object may be, for example, in the form of a graphite tube atomizer as used in flameless atomic absorption spectroscopy. In such atomizers, the graphite tube is heated by passing an electric current therethrough. A sample is inserted into this graphite tube and, during the heating process is first dried, then ashed, i.e., decomposed chemically, and eventually atomized at a high temperature. A beam of radiation of the resonance spectral line of the element to be detected is then passed through the atomic cloud to a suitable detector. The absorption, to which this beam of radiation is subjected, in the atomic cloud, is a measure of the proportion of the element being detected in the sample. During atomization, it is necessary to heat the sample to the desired atomization temperature as quickly as possible, while the slope of the temperature increase should be independent of the final temperature value.

In a prior art apparatus of this type, as described in "Analytical Chemistry", Vol. 46 (1974), No. 8, pages 1028–1030, the heating was effected with full heating power, until a preselected desired temperature was reached. This desired temperature was automatically maintained by switching the heating power on and off. In the prior art apparatus, temperature measurement was effected photometrically. To this end, radiation from the graphite tube was directed to a photodiode. A red filter was placed in front of the photodiode, which cut-off the wavelength range below 620 nm. By the elimination of the short-wave radiation, ambiguity of the output signal was avoided in a portion of the temperature range, said ambiguity resulting from the combination of the sensitivity characteristics of the diode and the variation of the wavelengths of the radiation, as a function of temperature. In such graphite tube atomizers, a rather large temperature range has to be covered, which extends from a relatively low drying temperature to the very high temperatures, which are required to atomize substances that are difficult to volatize. In the prior art apparatus, a temperature range of between 550° C and 2600° C was covered. This resulted in a variation of the photocurrent through a plurality of orders of magnitude, due to the fact that the spectral sensitivity of the photodiode combined with the filter was located on the short-wave slope of the spectral intensity distribution of the radiation source. Therefore, with increasing temperature, the spectral intensity distribution characteristics were shifted towards the range of sensitivity of the photodiode, in accordance with Wien's displacement law. As a result, the portion of the total radiation, which could be detected by the photodiode, increased with increasing temperature of the object. In addition, an increase in temperature involved a large increase in the radiation intensity. Variation of the output signal through a plurality of orders of magnitude within the temperature range to be covered presents extraordinary problems in the signal processing and in the dimensioning of the temperature control loop. The lower limit of the measuring range for the temperature was determined by the spectral sensitivity of the photodiode. If the photodiode was sensitive between 62 and 2 microns, only a very low proportion of the total radiation impinged upon the photodiode, when the temperature of the object was 100° C. Only at a substantially higher temperature would this proportion become measurable. With the means described in the above-described prior publication, it was, in fact, not possible to cover the desired measuring range of between 100° C and 2700° C.

Furthermore, it is known to use the radiation in a limited wavelength range for pyrometric temperature measurements. In the prior art methods, the purpose of the limitation of the wavelength range was to avoid disturbances due to absorption bands of carbon dioxide or water vapor. In a prior art method of this type (German Pat. No. 2,013,723), the temperatures of the textile surfaces in textile steaming plants were measured. Wavelength ranges between 3.4 and 4.5 microns or 9 to 10.5 microns were used. In this application, the measurement took place within a closely limited temperature range, the temperatures being of the order of 100° C.

Another prior art method relates to the measurement of the temperature from the radiation of refractory stones, bricks, or similar material. Also, in this method, disturbance of the measurement by the absorption of carbon dioxide or water vapor should be avoided, and for this purpose, a band filter, having a spectral transmission range of between 7.2 and 8.2 microns, was used. Also, in this prior art method, the temperature range in which the actual measurement took place was closely limited, as described in German Pat. No. 2,214,722.

It will be appreciated that both of the prior art methods just described measured the temperature over a very limited temperature range.

SUMMARY OF THE INVENTION

The basic and general object of the present invention is the provision of a device for a method and apparatus for pyrometric temperature measurement, which overcomes or at least mitigates some of the problems of the prior art, as outlined hereinabove.

Another object of the invention is to measure the temperature of an object over a large temperature range, with high accuracy and without physically contacting the object.

In accordance with the invention, pyrometic temperature measurement is carried out within a range of between about 100° C and about 2700° C in such a way that a signal indicative of the temperature of the object is derived from the total radiation within a limited wavelength range, extending from about 8 to about 14 microns. This range is selected in accordance with the spectral intensity distribution of an object at 100° C, in order to ensure that as large a radiation flux as possible gets into the radiation detector at the lower limit of the measuring range. The location of this spectral range on the long-wave slope of the intensity distribution characteristic curve causes the maxima of the intensity distribution characteristics to move away from the utilized spectral range, with increasing temperature. This means that the proportion of the total radiation detected by the radiation detector decreases with increasing temperature. This effect counteracts the rapid increase of the total radiation.

The requirement of high accuracy of a pyrometric temperature measurement at relatively low temperatures makes it desirable to modulate the radiation emanating from the object, in order to discriminate against radiation which, for example, emanates from other elements of the apparatus. According to one aspect of the invention, the radiation from the object and the radiation from a reference member of constant temperature are alternately detected within said limited wavelength range. The difference between these two detected values provides the signal indicative of the temperature of the object. Thus, the modulated radiation result clearly discriminates against background radiation. That is, radiation from the reference member, having an exactly defined temperature, is detected during the time when no radiation is being detected from the object, whereby the difference provides an unambiguous signal indicative of the temperature of the object.

The method of the invention is particularly suitable for automatically controlling the temperature of a graphite tube during the drying, ashing and atomization of the sample in flameless atomic absorption spectroscopy.

In one form of the invention, there is provided a new and improved device pyrometrically pyrometically measuring the temperature of an object within a temperature range of between about 100° C and about 2700° C, which comprises a radiation detector that is sensitive at least within a limited wavelength range of from about 8 to about 14 microns, a filter which is only transparent in said limited wavelength range, and a reference member. Further, the device includes a temperature control device for automatically maintaining the temperature of the reference member at a constant value, means for alternately directing radiation from the object and from the reference member through the filter to the radiation detector, and a signal processing circuit for receiving signals from the radiation detector and outputting a signal indicative of the temperature of the object responsive to the difference between the radiation detected from the object and from the reference member.

In one form of the invention, the object is arranged to image on the radiation detector through an imaging optical system. The radiation alternating device is a rotating vane assembly, which passes through the path of the rays in the optical system on the side thereof towards the object. The vanes are normal to the optical axis of this path of rays and are specularly reflecting on the surfaces facing the radiation detector. Further, the temperature of the radiation detector is controlled by the temperature control device. With such an arrangement, the beam directed from the object onto the radiation detector is cyclically interrupted by the vane. During this interruption, the radiation detector and its temperature-controlled surroundings are imaged onto itself through the specularly reflecting surface of the vane. The temperature of the radiation detector is controlled so that the latter serves as the temperature-control reference member. Due to the specularly reflecting surface, the vane emits practically no radiation towards the radiation detector. This provides two advantages, i.e., the radiation detector operates at a constant temperature so that the variation of the detector sensitivity as a function of temperature will not have any influence, and the radiation detector itself serves as a reference member. Preferably, the vane is specularly reflecting on both sides so that heating thereof by the radiation emanating from the object is kept to a minimum, and the effect of the vane on the detector signal is further reduced.

The use of radiation in the infrared range makes it necessary to construct the imaging optical system of optical elements or lenses which are transparent in the infrared range. For this purpose, rock salt lenses are appropriate. However, these materials are hygroscopic and have to be protected from moisture. In one form of the invention, the rock salt lens is mounted in a tubular mounting member, which is closed at the object end by the filter and at the other end by the radiation detector. The temperature control device comprises a heater by which the mounting member together with the radiation detector and the rock salt lens are heated to an operational temperature above the point of condensation, whereby condensation of moisture on the lens is avoided.

In another form of the invention, the object is imaged on the radiation detector by a germanium lens, which forms, at the same time, the substrate for the filter. Germanium has a very high index of refraction, i.e., about 4. As a result, with the same imaging conditions, such a lens requires refracting surfaces of considerably smaller curvature than a lens made of conventional materials. This results in reduced spherical aberration and, consequently, in better-focused images and increased intensity of the illumination of the radiation detector. On the other hand, lenses having a high index of refraction have high reflection losses, if the surfaces are not coated with reflex-reducing layers. Due to the fact that the lens serves as the substrate of the filter, the filter layers are reflex-reducing. Preferably, the lens is plano-convex and the filter layers of the filter, which is constructed as an interference filter, are provided on the plane surface of the lens. Appropriate reflex-reducing layers for the respective spectral range are provided on the convex surface of the lens.

There has thus been outlined rather broadly the more important features of the invention in order that the detailed description thereof that follows may be better understood, and in order that the present contribution to the art may be better appreciated. There are, of course, additional features of the invention that will be described more fully hereinafter. Those skilled in the art will appreciate that the conception on which this disclosure is based may readily be utilized as the basis of the designing of other methods and apparatus for carrying out the various purposes of the invention. It is important, therefore, that this disclosure be regarded as including such equivalent methods and apparatus as do not depart from the spirit and scope of the invention.

Several embodiments of the invention have been chosen for purposes of illustration and description, and are shown in the accompanying drawings forming a part of the specification.

DETAILED DESCRIPTION OF THE PREFERRED EMBODIMENT

Figure 1:
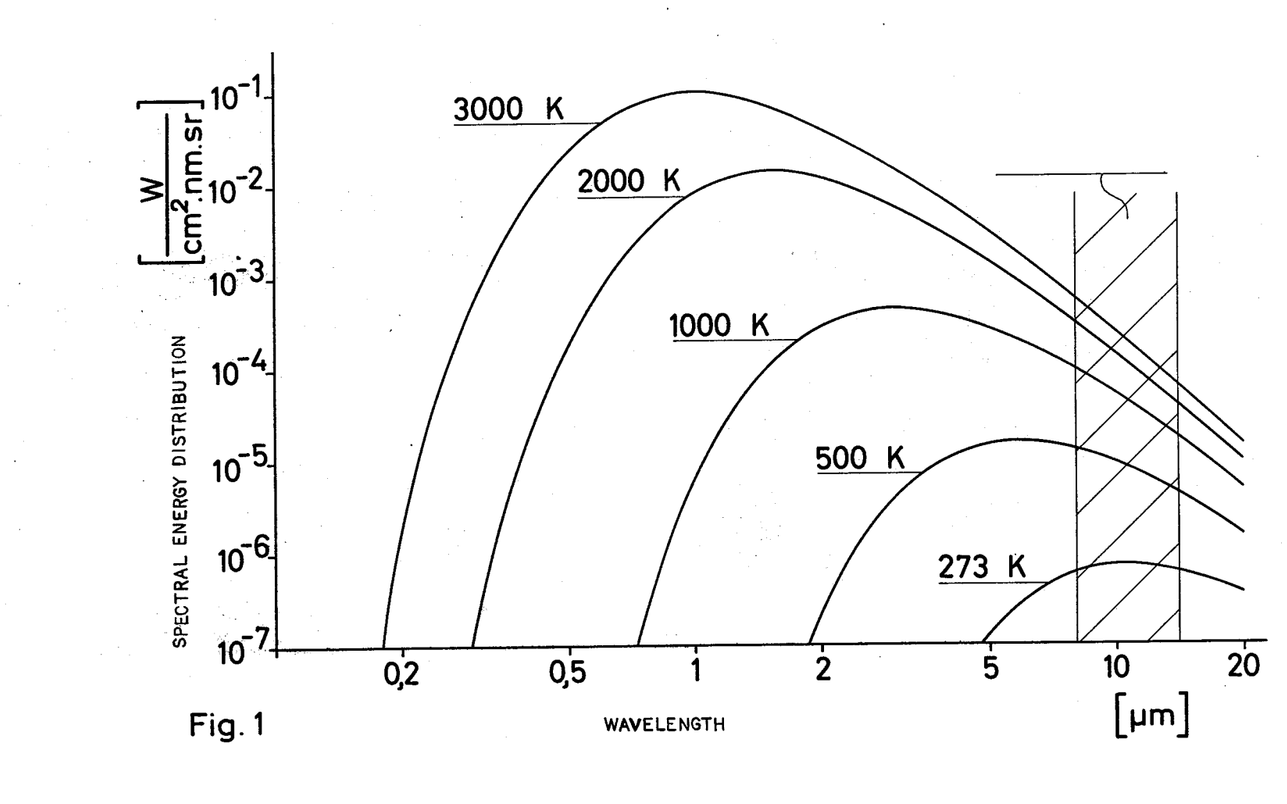
FIG. 1 is a graphic illustration of the spectral energy distribution of the radiation from an object plotted as a function of the wavelength for a number of different temperatures.
Figure 2:
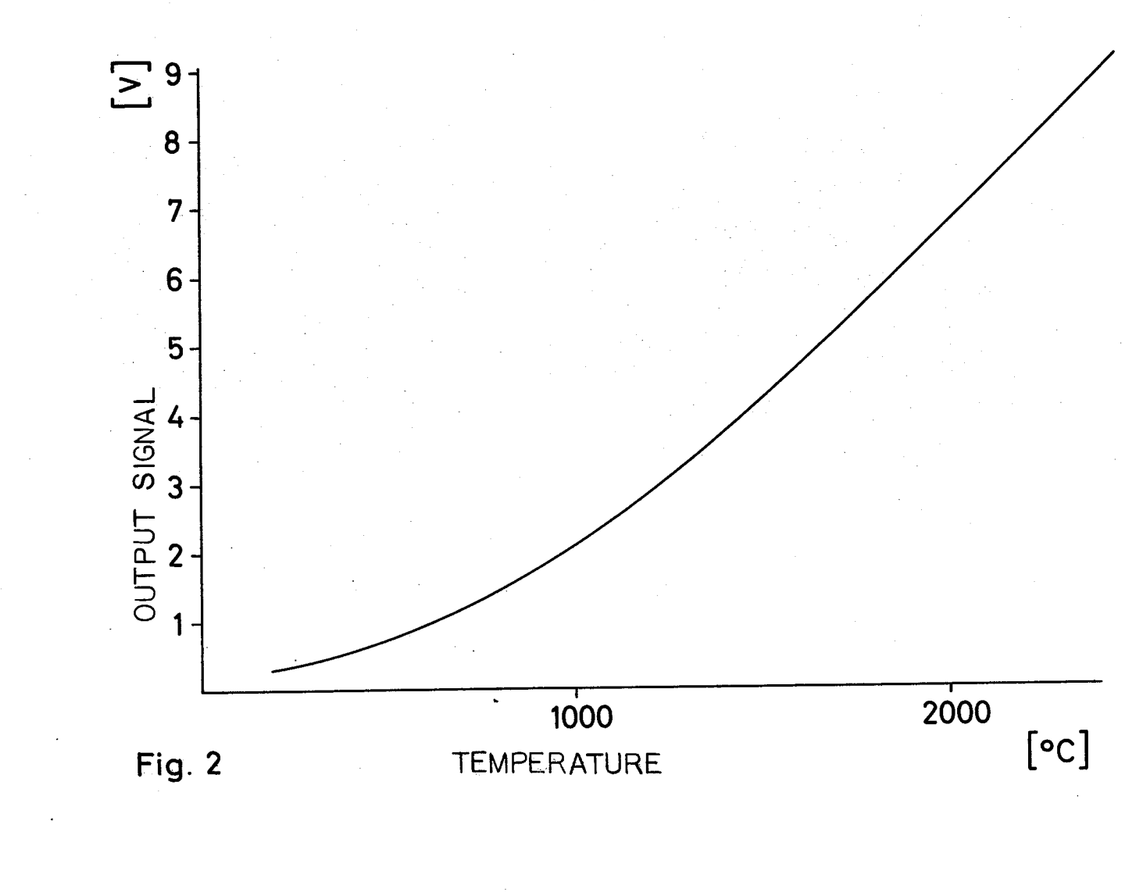
FIG. 2 is a graphic illustration of the variation of the detector signal with respect to the temperature obtained, while employing the method of the present invention, within the measuring range of between 100° C and 2700° C.

Referring first to FIG. 1, the spectral energy distribution of the radiation of a substantially black object is plotted as a function of wavelength for a number of different temperatures between 273° Kelvin and 3000° Kelvin. The total radiation is represented by the area below the plots illustrated. It is noted that this total radiation increases very steeply with temperature. Furthermore, it is noted that the maximum of the spectral intensity distribution is displaced towards the shortwave range, with increasing temperature (Wien's displacement law). A pyrometer, which is to operate over a temperature range of between 100° C and 2700° C, or approximately between 300° Kelvin and 3000° Kelvin, while using the total radiation, would produce an output signal, which varies through a plurality of orders of magnitude within said measuring range. In order to be able to cover this temperature range with a tolerable variation of the output signal, in accordance with the present invention, the total radiation is measured in a limited wavelength range or band of between about 8 and about 14 microns. As can be seen from FIG. 2, temperature variation, in a range of between about 100° C and about 2700° C, results in an output signal which varies with temperature, within tolerable limits.

Figure 3:
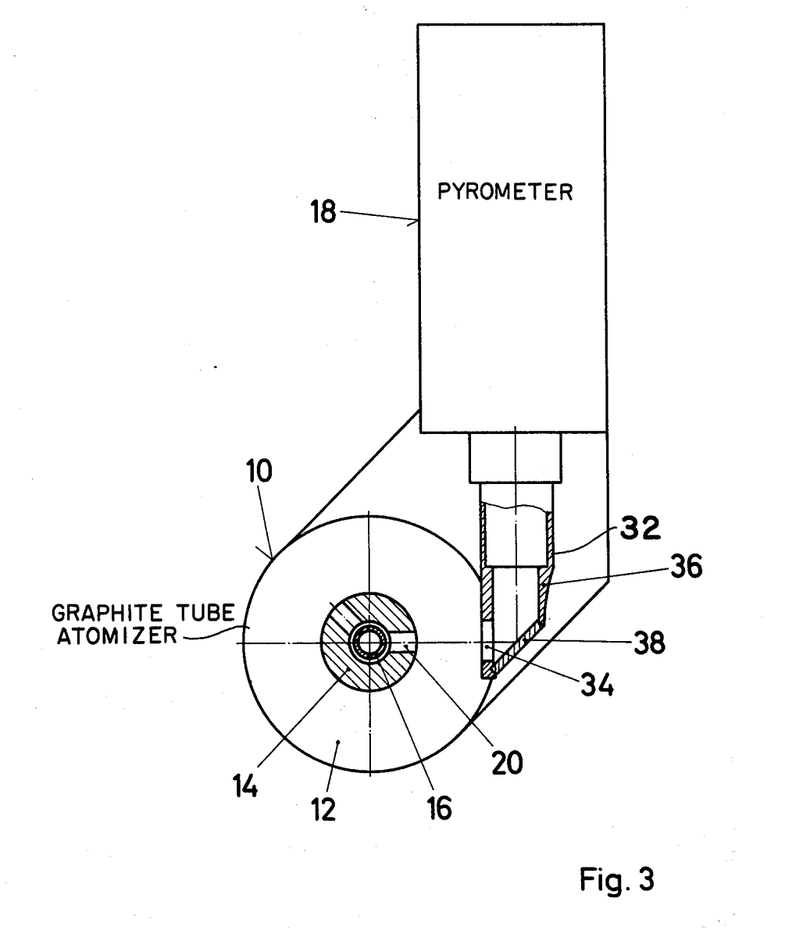
FIG. 3 is a side elevational view, partly in section, of a pyrometer with a graphite tube atomizer, according to the invention.
Figure 4:
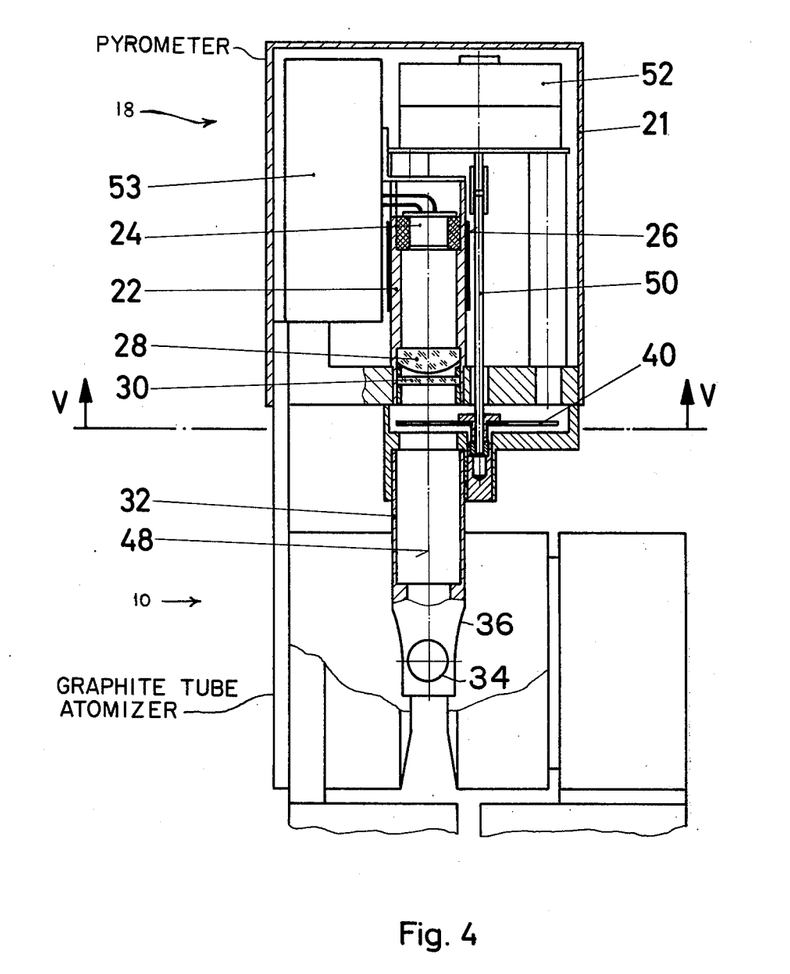
FIG. 4 is a front elevational view, partly in section, of the graphite tube atomizer and pyrometer of FIG. 3.
Figure 5:
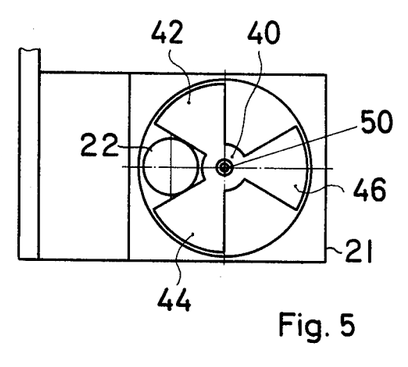
FIG. 5 is a sectional view taken along the line indicated at V—V of FIG. 4.

Referring to FIGS. 3 to 5, the invention is described with reference to the measurement of the temperature of a graphite tube in a graphite tube atomizer for flameless atomic absorption spectroscopy. The graphite tube atomizer 10 includes a casing 12 which encloses a two-part graphite enclosure 14, forming the electrodes. A graphite tube 16 is supported within the graphite enclosure between the two parts thereof. The graphite tube 16 is heated by passing an electric current therethrough, the temperature of the graphite tube being able to vary in a range of between 100° C and at least 2700° C, depending on the requirements of the analysis. The temperature of the graphite tube 16 is observed by a pyrometer 18 through a lateral bore 20 of the graphite enclosure 14. The temperature value observed is used, in a manner well known and therefore not shown in detail, to automatically control the current flow through the graphite tube 16 so that the graphite tube 16 may be heated quickly to a predetermined temperature setpoint and then maintained at this temperature.

The pyrometer 18 comprises a generally rectangular housing 21, in which a tube 22 is supported in a vertical position. A radiation detector 24, located at the upper end of the tube 22, responds to radiation at least within the wavelength range of between 8 and 14 microns. Any suitable detector may be employed such as a thermocouple detector, for example. The radiation detector is surrounded by a heating coil 26, which is controlled to maintain the temperature of the detector at a preselected constant temperature. The detector and the heating coil 26 serve to seal the tube 22 at its upper end. A rock salt lens 28 is mounted in the lower portion of the tube 22. An interference filter 30 is located below the lens 28, said filter passing radiation in the wavelength range of between 8 and 14 microns. A further tube 32 is provided in alignment with the tube 22, spaced from the lower end face thereof. A mirror mount 36, having a lateral aperture 34, is provided at the lower end of the tube 32, and a deflecting mirror 38 is mounted on the mirror mount at an angle of 45° with respect to the axis of the tube 32. Radiation from the graphite tube 16 passes through the bore 20, the aperture 34, and is deflected through 90° by the mirror 38 so that it reaches the radiation detector 24 along the axis of the tube 32 and the axis of the tube 22. A vane assembly 40 extends into the gap formed between the lower end face of the tube 22 and the upper end face of the tube 32. The vane assembly has three vanes 42, 44, and 46 arranged normal to the optical axis 48 of the lens 28, with each vane extending through an angle of 60°. The optical axis 48 coincides with the axis of the tubes 22 and 32. The vane assembly 40 rotates with a shaft 50, which extends upwardly adjacent the tube 22, and is driven by a motor 52. The motor 52 is supported in the housing 21 above the tube 22. The vanes in the vane assembly 40 are specularly reflecting on both sides.

In operation, when the vane assembly 40 is in the position illustrated in FIG. 5, wherein the path of the rays is free or open from the graphite tube 16 via the deflecting mirror 38 to the radiation detector 24, a portion of the surface of the graphite tube 16 will be imaged on the radiation detector 24. The filter 30 only passes radiation within a limited wavelength range (as illustrated in FIG. 1), and the radiation detector 24 generates a signal, depending on the temperature of the graphite tube 16. In addition, the radiation detector is exposed to the radiation which, for example, emanates from the wall of the tube 22. After clockwise rotation of the vane assembly 40 through 60°, the vane 44 will be located in the path of the radiation rays. The radiation falling upon the vane 44 from the graphite tube via the mirror 38 is mostly reflected so that it causes no substantial heating of the vane assembly 40. Because the surfaces of the vanes are reflecting on the side facing the detector, the radiation emitted towards the detector is negligible. However, the upper specularly reflecting surface of the vane 44 reflects the image of the radiation detector 24. Thus, the radiation detector 24 receives, radiation which is determined by its own temperature, and the detector, itself, serves as the reference member. By means of the heating coil 26, the radiation detector is heated to a temperature, which is clearly above the point of condensation of atmospheric water vapor.

The detector supplies an A.C. signal, the amplitude of which depends on the difference between the radiation of the object or graphite tube 16 and the radiation of the reference or detector 24. Because the latter is maintained at a constant temperature, the amplitude of the A.C. signal is directly indicative of the temperature of the graphite tube 16. By virtue of the modulation, the influence of the other radiating parts such as, for example, the tube 22 is eliminated.

By controlling the temperature of the radiation detector 24, not only is there provided a reference member of constant temperature, but also variation of the sensitivity of the detector due to temperature is eliminated. In addition, condensation of water vapor on the surface of the rock salt lens 28 is prevented by maintaining the detector 24 and the tube 22 at a temperature above the condensation point, thereby preventing corrosion of the lens.

The A.C. signal is converted to a D.C. voltage in an appropriate manner by phase controlled demodulation in a signal processing circuit 53. The D.C. voltage is utilized to automatically control the current flowing through the graphite tube. It is particularly important that the radiation of the graphite tube 16 be measured with respect to the radiation of a reference member, which has an accurately defined temperature, because the temperature of the graphite tube at the lower end of the measuring range is of the same order of magnitude as the temperature of the reference member. That is, in this range, the level of radiation emanating from the object or graphite tube 16 is relatively low, and the temperature of the reference member is also relatively low. An accurate measurement in this range is only possible if stray radiation from other parts of the pyrometer is eliminated by modulation of the useful radiation, and if the reference member is maintained at a well-defined temperature.

Figure 6:
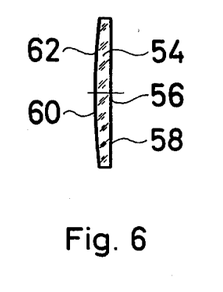
FIG. 6 is an enlarged view of a lens filter combination, according to a modification of the embodiment of FIGS. 3-5.

It will be appreciated that, instead of using the rock salt lens 28, which is hygroscopic, a lens 54, FIG. 6, of germanium, of optical quality, may be used. Germanium has a high index of refraction, i.e., about 4. Therefore, strong reflections may occur at the boundary surfaces if no preventive measures are taken. In the embodiment of the invention illustrated in FIG. 6, the lens 54 is designed as a plano-convex lens. The filter layers 58 of the interference filter are applied to the plane surface 56 of the lens to limit the wavelength range of the radiation falling on the radiation detector 24. Also, the convex surface 60 of the lens is provided with a filter layer or at least a reflex-reducing layer 62. Due to the high index of refraction, only a slightly curved refracting surfaces are required for imaging. As a result, spherical aberration can be reduced and a well-focused image can be achieved with a relatively simple lens. Because of the filter layers and the reflex-reducing layers, respectively, the reflection losses in the wavelength range of interest may be kept to a minimum. There is no need to provide an additional substrate for the interference filter. In this embodiment, the material of the lens 54 is not hygroscopic so that the lens need not be maintained in a moisture-free atmosphere.

Having thus described the invention with particular reference to the preferred forms thereof, it will be obvious to those skilled in the art to which the invention pertains, after understanding the invention, that various changes and modifications may be made therein without departing from the spirit and scope of the invention, as defined by the claims appended hereto.

What is claimed is:

1. A device for pyrometrically measuring temperature of an object within range of between about 100° C and about 2700° C comprising:
    a radiation detector, sensitive at least in a limited wavelength range of from about 8 to about 14 microns,
    a filter which is only transparent in said limited wavelength range,
    a reflecting member for imaging the radiation detector onto itself,
    temperature control means for automatically maintaining the temperature of the radiation detector at a substantially constant value,
    means for alternately directing radiation from said object and the radiation of the detector reflected from the reflecting member to the radiation detector through the filter, and
    signal processing means for receiving signals from said radiation detector and outputting a signal indicative of the temperature of the object, responsive to the difference between the radiation detected from the object and the radiation of the detector reflected from the reflecting member 2. A device for pyrometrically measuring temperature of an object according to claim 1 further comprising an imaging optical system mounted to image the object on the radiation detector,
    said means for alternately directing the radiation comprises a rotating vane assembly mounted to pass through the path of rays in the optical system on the object side thereof and being disposed normal to the optical axis of said path of rays, said reflecting member being vanes in said vane assembly which are specularly reflecting on the surface facing said radiation detector.

3. A device for pyrometrically measuring temperature of an object according to claim 2 wherein both sides of said vanes have specularly reflecting surfaces.

4. A device for pyrometrically measuring temperature of an object according to claim 2 wherein said imaging optical system comprises a germanium lens, said lens forming a substrate for said filter.

5. A device for pyrometrically measuring temperature of an object according to claim 1 wherein said object is a graphite tube of a flameless atomic absorption spectroscope.

6. A device for pyrometrically measuring temperature of an object within a range of between about 100° C and about 2700° C comprising:
    a radiation detector, sensitive at least in a limited wavelength range from about 8 to about 14 microns,
    a filter which is only transparent in said limited wavelength range,
    a reference number,
    temperature control means for automatically maintaining the temperature of the reference member at a substantially constant value,
    means for alternately directing radiation from said object and from the reference member to the radiation detector through the filter comprising an imaging optical system mounted to image the object on the radiation detector, a rotating vane assembly mounted to pass through the path of rays in the optical system on the object side thereof and being disposed normal to the optical axis of said path of rays, vanes in said vane assembly being specularly reflecting on the surface facing said radiation detector, said imaging optical system comprising a germanium lens, said lens forming a substrate for said filter, said lens being plano-convex and said filter being constructed in the form of an interference filter, with the filter layers being provided on the plane surface of the lens, and
    signal processing means for receiving signals from said radiation detector and outputting a signal indicative of the temperature of the object, responsive to the difference between the radiation detected from the object and from the reference member.

7. A method of pyrometrically measuring the temperature of an object within a temperature range of between about 100° C and about 2700° C comprising the steps of alternately detecting the radiation from the object and the radiation of the detector reflected from a reflecting member, maintaining the temperature of the detector at a substantially constant value, limiting the wavelength range of the radiation from the object and from the reflecting member to within a wavelength range of from about 8 to about 14 microns, and deriving a signal indicative of the temperature of the object from the difference of the detected radiation from the object and the radiation of the detector reflected from the reflecting member.

8. A method of pyrometrically measuring the temperature of an object according to claim 7 wherein the derived signal indicative of the temperature of the object is used to control the temperature of a graphite tube during the drying, ashing and atomizing of a sample in a flameless atomic absorption spectroscope.

9. A device for pyrometrically measuring temperature of an object within a range of between about 100° C and about 2700° C comprising:

a radiation detector, sensitive at least in a limited wavelength range of from about 8 to about 14 microns, a filter which is only transparent in said limited wavelength range, a reference member, means for alternately directing radiation from said object and from the reference member to the radiation detector through the filter comprising an imaging optical system mounted to image the object on the radiation detector, a rotating vane assembly mounted to pass through the path of rays in the optical system on the object side thereof and being disposed normal to the optical axis of said path of rays, vanes in said vane assembly being specularly reflecting on the surface facing said radiation detector, said imaging optical system comprising a rock salt lens, a tubular member, said lens being mounted in said tubular member, the end of said tubular member towards the object being closed by said filter and the other end being closed by said radiation detector, temperature control means for automatically maintaining the temperature of the reference member at a substantially constant value and for simultaneously heating the rock salt lens to an operational temperature above the point of condensation, and signal processing means for receiving signals from said radiation detector and outputting a signal indicative of the temperature of the object, responsive to the difference between the radiation detected from the object and from the reference member.

* * * * *